United States Patent
Penberthy et al.

(10) Patent No.: US 10,929,856 B2
(45) Date of Patent: Feb. 23, 2021

(54) METHOD AND SYSTEM FOR SELECTING AND DELIVERING MEDIA CONTENT VIA THE INTERNET

(75) Inventors: John S. Penberthy, Croton on Hudson, NY (US); Simon A. Assaad, Far Hills, NJ (US); David V. Carson, Westport, CT (US); Bradley G. Johnson, Brooklyn, NY (US)

(73) Assignee: NYTELL SOFTWARE LLC, Wilmington, DE (US)

( * ) Notice: Subject to any disclaimer, the term of this patent is extended or adjusted under 35 U.S.C. 154(b) by 1522 days.

(21) Appl. No.: 13/584,154

(22) Filed: Aug. 13, 2012

(65) Prior Publication Data
US 2012/0311420 A1    Dec. 6, 2012

Related U.S. Application Data

(63) Continuation of application No. 12/465,907, filed on May 14, 2009, now Pat. No. 8,265,990.
(Continued)

(51) Int. Cl.
*G06Q 30/00* (2012.01)
*G06Q 30/02* (2012.01)
(Continued)

(52) U.S. Cl.
CPC .............. *G06Q 30/02* (2013.01); *G06F 16/00* (2019.01); *G06F 16/951* (2019.01);
(Continued)

(58) Field of Classification Search
CPC .............. G06F 17/3089; G06F 17/2247; G06F 17/2235; G06F 17/30905; G06F 17/30899;
(Continued)

(56) References Cited

U.S. PATENT DOCUMENTS 6,757,661 B1 *  6/2004  Blaser ................... G06Q 30/02
                                                          705/14.54
6,976,010 B2   12/2005  Banerjee et al.
(Continued)

FOREIGN PATENT DOCUMENTS

WO      WO 02/17205        2/2002

OTHER PUBLICATIONS

Yih, Wen-tau, et al., Finding Advertising Keywords on Web Pages, International World Wide Web Conference Committee (IW3C2), WWW 2006, May 23-26, 2006, downloaded from https://www.cs.cmu.edu/~vitor/papers/www06.pdf dated Sep. 30, 2020 (Year: 2006).*
(Continued)

*Primary Examiner* — Scott D Gartland
(74) *Attorney, Agent, or Firm* — Christensen O'Connor Johnson Kindness PLLC

(57) ABSTRACT

A system and method for selecting portions of content, and media content sets to be delivered over a packet based network is provided. The selected portions of content (such as a web page) may be keywords such as a word or a group of words. The media content sets may include one or more of video content (that may include an audio portion), audio content, graphics, images, or other multimedia or single media content. The media content set may include advertising, informational, business, educational, governmental, institutional, customized (e.g., personalized) content and/or other content. According to an example embodiment, the present invention provides a heuristic model employing a piece-wise linear optimization function to select keywords and the media content sets for delivery by a media delivery provider.

27 Claims, 10 Drawing Sheets

Related U.S. Application Data

(60) Provisional application No. 61/053,511, filed on May 15, 2008.

(51) Int. Cl.
*G06F 16/00* (2019.01)
*G06F 16/951* (2019.01)

(52) U.S. Cl.
CPC ..... *G06Q 30/0244* (2013.01); *G06Q 30/0246* (2013.01); *G06Q 30/0249* (2013.01); *G06Q 30/0256* (2013.01); *G06Q 30/0261* (2013.01); *G06Q 30/0264* (2013.01); *G06Q 30/0275* (2013.01)

(58) Field of Classification Search
CPC .. G06F 17/211; G06F 17/30882; G06F 16/00; G06F 16/951; Y10S 707/99933; H04L 67/02; G06Q 30/02; G06Q 30/0244; G06Q 30/0249; G06Q 30/0256; G06Q 30/261; G06Q 30/0264; G06Q 30/0275
USPC .......... 705/14.1, 14.43, 14.45, 14.48, 14.54, 705/14.58, 14.61, 14.71
See application file for complete search history.

(56) References Cited

U.S. PATENT DOCUMENTS

| | | | |
|---|---|---|---|
| 7,406,499 B2 | 7/2008 | Singh et al. | |
| 7,769,827 B2 | 8/2010 | Girouard et al. | |
| 8,265,990 B2 * | 9/2012 | Penberthy et al. | 705/14.1 |
| 2002/0082901 A1 * | 6/2002 | Dunning | G06F 17/30017 |
| | | | 705/26.63 |
| 2002/0138844 A1 | 9/2002 | Otenasek et al. | |
| 2004/0010467 A1 | 1/2004 | Hori et al. | |
| 2004/0093327 A1 * | 5/2004 | Anderson | G06Q 30/02 |
| 2004/0225612 A1 | 11/2004 | Shimojima et al. | |
| 2005/0047752 A1 | 3/2005 | Wood et al. | |
| 2005/0076014 A1 * | 4/2005 | Agarwal | G06Q 30/02 |
| 2005/0144136 A1 | 6/2005 | Murashita | |
| 2006/0095507 A1 | 5/2006 | Watson | |
| 2006/0135142 A1 | 6/2006 | Repka | |
| 2006/0168510 A1 | 7/2006 | Bryar et al. | |
| 2006/0173985 A1 | 8/2006 | Moore | |
| 2007/0038567 A1 | 2/2007 | Allaire et al. | |
| 2007/0061198 A1 * | 3/2007 | Ramer | G06Q 20/12 |
| | | | 705/14.53 |
| 2007/0180523 A1 | 8/2007 | Jablonski et al. | |
| 2007/0214498 A1 | 9/2007 | Pindra et al. | |
| 2007/0219910 A1 | 9/2007 | Martinez | |
| 2007/0238474 A1 | 10/2007 | Ballas et al. | |
| 2007/0240039 A1 | 10/2007 | Hosotsubo | |
| 2007/0250467 A1 | 10/2007 | Mesnik et al. | |
| 2007/0282819 A1 | 12/2007 | Lynn et al. | |
| 2007/0288950 A1 | 12/2007 | Downey et al. | |
| 2007/0299935 A1 | 12/2007 | Plastina et al. | |
| 2008/0010112 A1 | 1/2008 | Kniaz et al. | |
| 2008/0027931 A1 | 1/2008 | Lu et al. | |
| 2008/0066172 A1 | 3/2008 | Tarsi | |
| 2008/0092189 A1 | 4/2008 | Baker et al. | |
| 2008/0097830 A1 | 4/2008 | Kim | |
| 2008/0120156 A1 | 5/2008 | Nusbaum | |
| 2008/0120668 A1 | 5/2008 | Yau | |
| 2008/0126364 A1 | 5/2008 | Khosravy et al. | |
| 2008/0134249 A1 | 6/2008 | Yang et al. | |
| 2008/0148322 A1 | 6/2008 | Howcroft | |
| 2008/0215675 A1 | 9/2008 | Kaminitz et al. | |
| 2008/0243822 A1 * | 10/2008 | Campbell | G06F 17/3087 |
| 2008/0263602 A1 | 10/2008 | Murray et al. | |
| 2008/0271080 A1 | 10/2008 | Gossweiler et al. | |
| 2008/0294647 A1 | 11/2008 | Ramaswamy | |
| 2008/0320512 A1 * | 12/2008 | Knight | G06Q 30/02 |
| | | | 725/32 |
| 2009/0164271 A1 | 6/2009 | Johnson et al. | |
| 2009/0199242 A1 | 8/2009 | Johnson et al. | |
| 2009/0287567 A1 | 11/2009 | Penberthy et al. | |
| 2010/0138452 A1 * | 6/2010 | Henkin | G06Q 30/0256 |
| | | | 707/803 |
| 2010/0146077 A1 | 6/2010 | Davies et al. | |
| 2010/0274815 A1 | 10/2010 | Vanasco | |
| 2011/0093926 A1 | 4/2011 | Martin et al. | |
| 2011/0202953 A1 | 8/2011 | Johnson et al. | |
| 2011/0314368 A1 | 12/2011 | Chevalier | |

OTHER PUBLICATIONS

U.S. Appl. No. 11/750,665, filed May 18, 2007, Carson et al.
U.S. Appl. No. 61/053,511, filed May 15, 2008, Assaad et al.

* cited by examiner

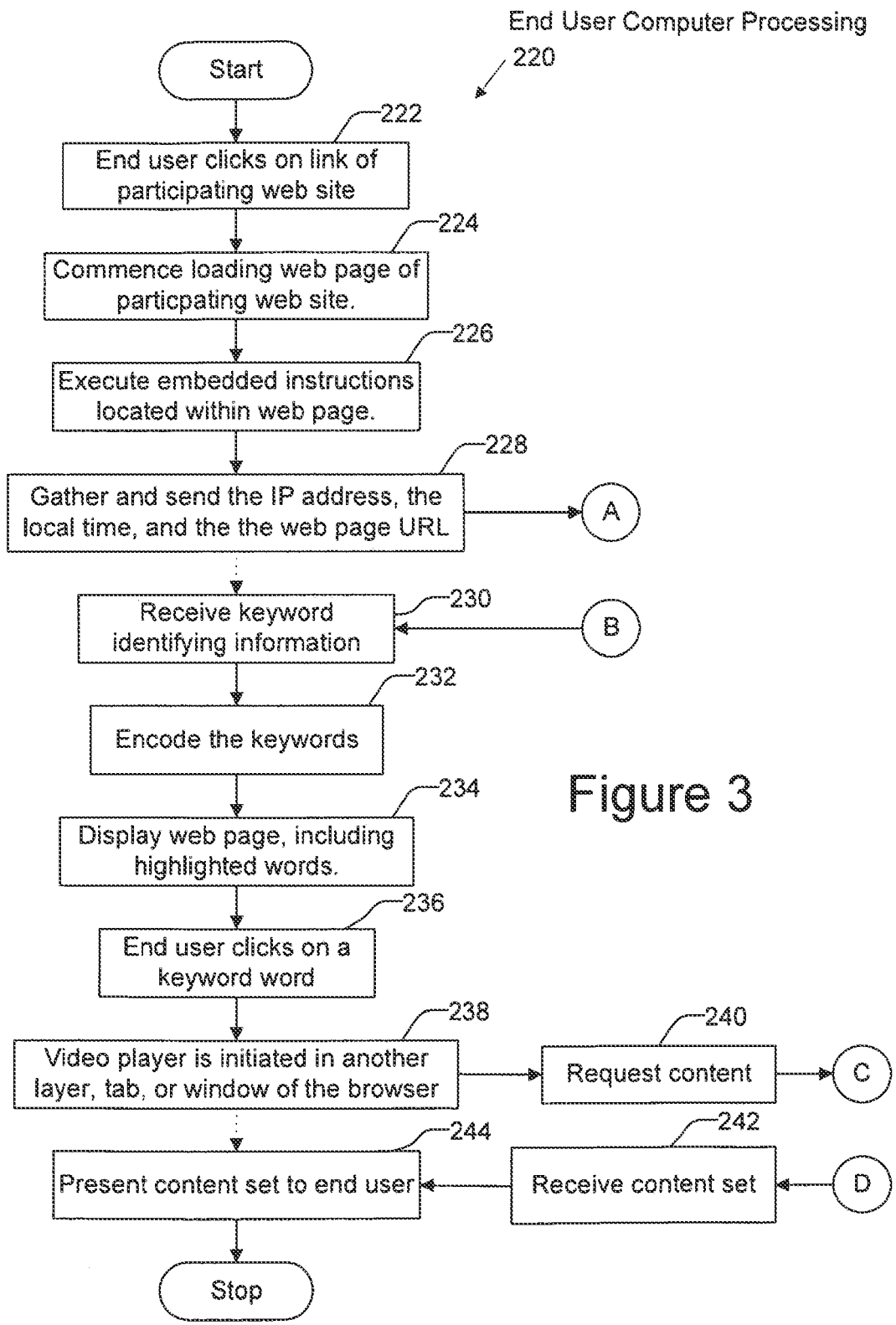

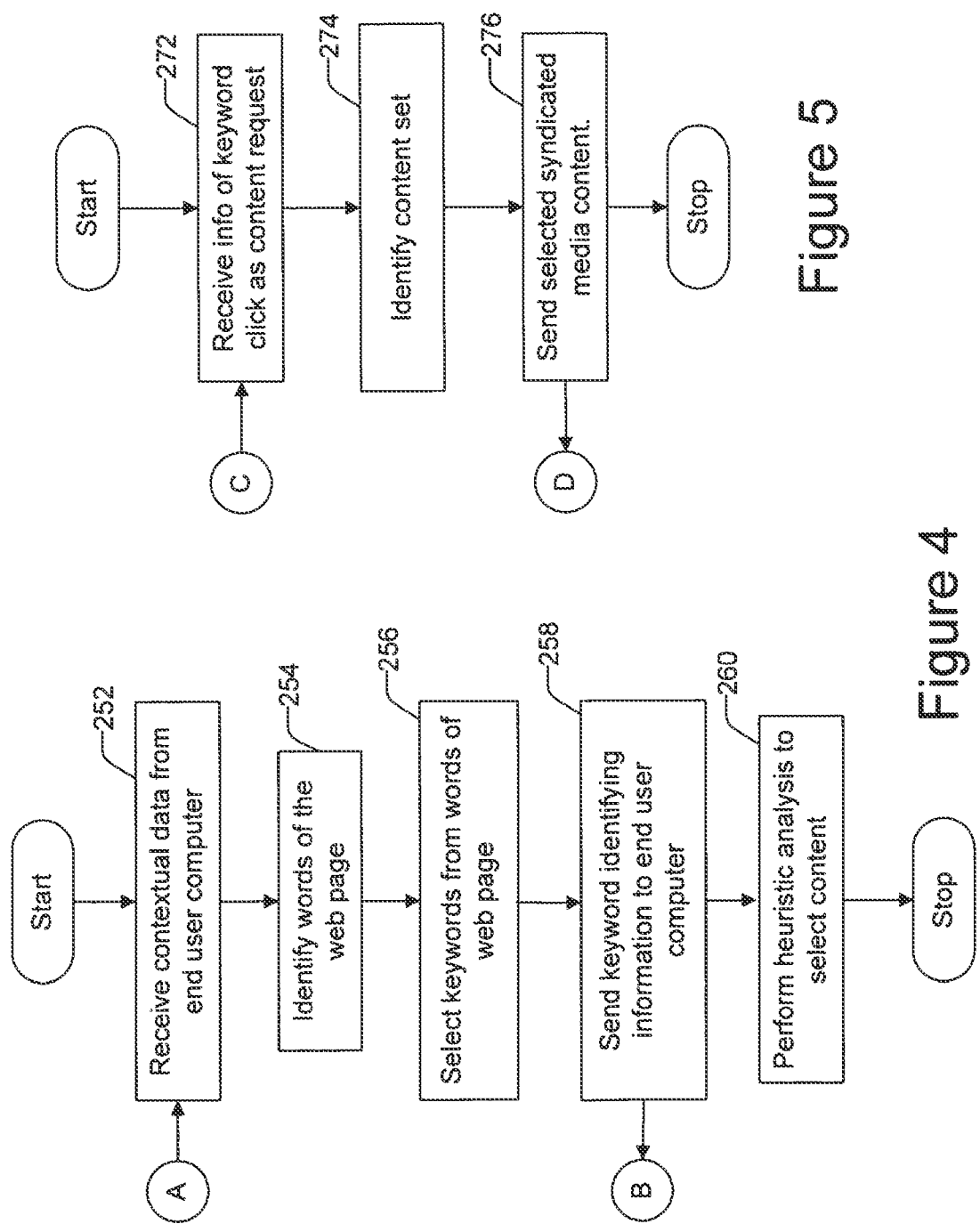

METHOD AND SYSTEM FOR SELECTING AND DELIVERING MEDIA CONTENT VIA THE INTERNET

CROSS REFERENCE TO RELATED APPLICATIONS

This application is a continuation of U.S. application Ser. No. 12/465,907, filed on May 14, 2009, now U.S. Pat. No. 8,265,990, issued Sep. 11, 2012, which claims priority to U.S. Provisional Application No. 61/053,511 filed May 15, 2008, each of which is hereby incorporated herein by reference in its entirety.

TECHNICAL FIELD

The present invention generally relates to a method and system for providing media content via the internet, and more particularly, to a method and system for selecting and delivering media content, such as video content and advertisements, via a packet based network such as the internet.

BACKGROUND

Broadcast networks for television and radio typically insert advertisements into a broadcast feed for presentation to all the consumers. Information, such as how many consumers experienced the advertisement; which end users experienced the advertisement; and which end users responded to the advertisement, typically is not available. In addition, conventional broadcast advertisements are aired without detailed contextual information and do not provide means for the consumer to supply personal information, request additional information, or facilitate impulse responses to the advertisements.

In contrast, interactive networks such as the internet are more amenable to the selective and precise distribution of media content, including advertisements. Typical internet advertisements take the form of a still image (e.g., a banner ad) and/or a hyperlink presented on a static web page. These advertisements are typically sold based on the number of impressions, the number of click-throughs, customer satisfaction surveys, advertising revenue, or downstream purchases or activity.

While the Internet has become a widespread means of communicating data, it is now becoming a primary means of communicating video content globally. Most web pages include text, graphics, and other non-video data. Video files and some audio files tend to be larger than other types of files. The availability of broadband allows users to transmit and receive larger files in acceptable time frames. Thus, the adoption of broadband, at least in part, has led to the increase in the amount of video and audio data communicated over the Internet.

It would be desirable to offer and supply media content (e.g., textual, graphic, video, and/or audio content including advertisements) with portions of content, such as web pages, that the user is viewing. In addition, it would be desirable to select the content based on the end user's viewing context. More specifically, there is a need for a system and method for selecting portions of content, such as keywords on a web page, to be associated with media content and for selecting media content in manner to provide the highest media experience. For example, it would be desirable to select the keywords and media content based on the viewing context of the end user such as, for example, the content (e.g., words) the user is viewing, the location of the user, the web page, and the local time at the user's location.

One of the challenges in selecting media content is that there are so many works of media content from which to select. The quantity of web addresses, textual content, videos, and advertisements number in the billions as of this writing. Consequently, selecting media content from the large amount of selectable media in a manner that maximizes the value to the media provider (e.g., an advertiser) is very challenging. For example, selecting one or more keywords on a web page to be highlighted and selecting an associated content set comprising a video, advertisement(s), and a video channel to be presented to the end user in a manner that provides enhanced value and that is scalable for millions of dynamic web pages is very challenging.

These challenges and others may be overcome by some of the embodiments of the present invention.

SUMMARY

The present invention provides a system and method for selecting portions of content, and media content sets to be delivered over a packet based (e.g., an internes protocol (IP)) network. The selected portions of content (such as a web page) may be keywords such as a word or a group of words. The media content sets may include one or more of video content (that may include an audio portion), audio content, graphics, images, or other multimedia or single media content. The media content set may include advertising, informational, business, educational, governmental, institutional, customized (e.g., personalized) content and/or other content. According to an example embodiment, the present invention provides a heuristic model employing a piece-wise linear optimization function to select keywords and the media content sets for delivery by a media delivery provider.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 3 provides a flow chart of a method performed at an end user computer for selecting and delivering media content according to an example embodiment of the present invention.

FIG. 4 provides a flow chart of a method for selecting media content according to an example embodiment of the present invention.

FIG. 5 provides a flow chart of a method for delivering media content according to an example embodiment of the present invention.

DETAILED DESCRIPTION OF ILLUSTRATIVE EMBODIMENTS

Figure 1:
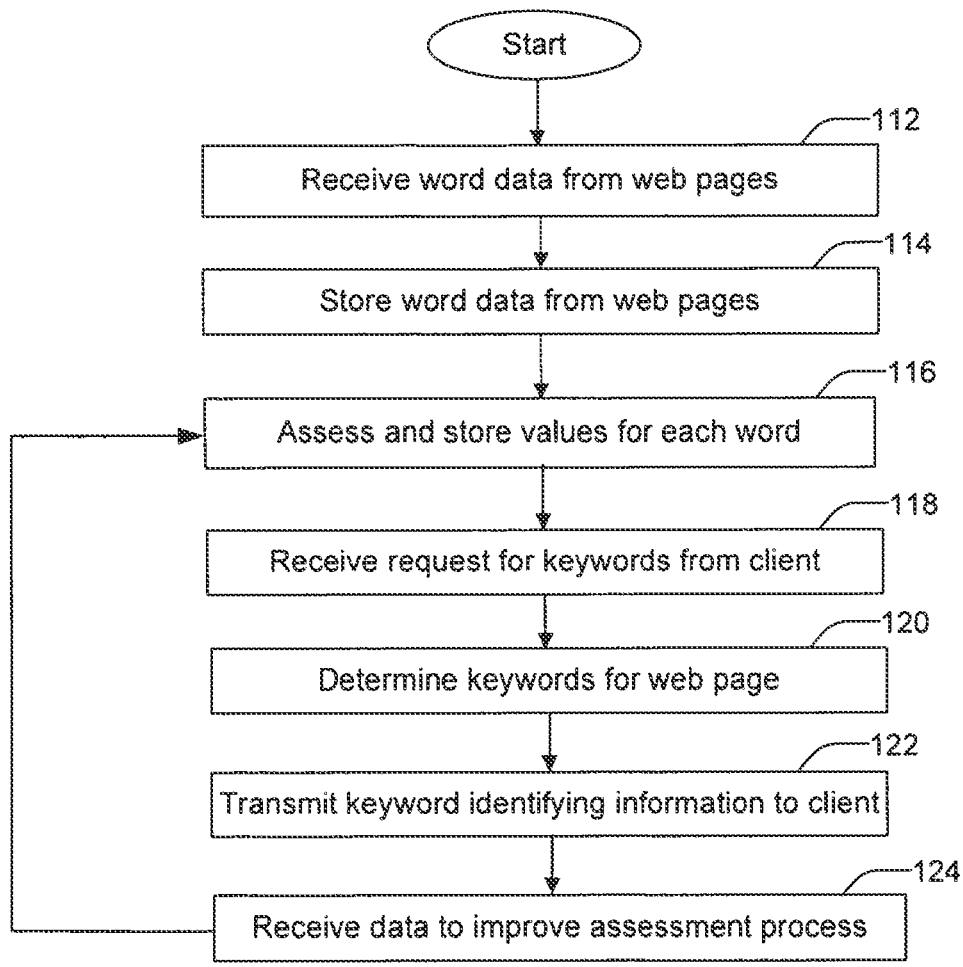
FIG. 1 provides a flow chart of a process that may be implemented for some example embodiments of the present invention.

In the following description, for purposes of explanation and not limitation, specific details are set forth, such as particular networks, communication systems, computers, terminals, devices, components, techniques, advertisements, ad units, ad unit types, servers, communication paths, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, advertisements, ad units, ad unit types, servers, communication paths, data and network protocols, software products and systems, operating systems, development interfaces, and hardware are omitted so as not to obscure the description.

System and Method Overview

The present invention provides a system and method for selecting portions of content and media content sets to be delivered over a packet based (e.g., an internet protocol (IP)) network. The selected portions of content may be a word or group of words and are referred to herein as collectively as "keywords." The media content sets may include one or more of video content (that may include an audio portion), audio content, graphics, images, or other multimedia or single media content. The media content set may include advertising, informational, business, educational, governmental, institutional, customized (e.g., personalized) content and/or other content. According to an example embodiment of the present invention a heuristic model employing a piece-wise linear optimization function to select keywords and the media content sets for delivery by a media delivery provider is provided.

The system may be implemented through use of a syndicated media content server, a plurality of third party web site servers, and the end user computing devices. The media delivery provider, for example, may operate a syndicated media content server which may receive, store and host the media content to be syndicated. The method may be adapted in various embodiments to optimize or enhance value, such as value to end users, advertisers, and/or service providers.

The syndicated content may be delivered to the end user via user access to participating third party web sites (referred to herein as a publisher websites), hosted by conventional web site servers. More specifically, the end user may access a web site using a browser application (a client) executed on a personal computer, smart phone, or other computing device (collectively referred to herein as a "computer").

From the end user's perspective, syndicated media content is accessed by clicking on one or more highlighted keywords on a publisher's web page. Different words may be highlighted at different times and for different people based on the website (or web page), client (the end user's) location, local time (at the location of the end user), and/or other factors. In response, the syndicated content may appear in a popup window or in a separate browser window/tab or overlaid the already displayed web page in a different layer. A video player in the new layer or window may commence playing the syndicated video content.

Some embodiments may employ a heuristic method by which the words are selected for highlighting for a given viewing of a web page—the web page being evaluated offline. According to one embodiment of the present invention, words on a web page may be assessed and accorded one or more values. In some embodiments, every word is assessed. In other embodiments, a portion of the web page source code is tagged with pre-defined HTML tags to indicate which words on the web page are to be assessed. For example, text within one or more paragraphs, text boxes, or sentences may be tagged and evaluated.

There may be multiple values accorded to each word (or group of words), such as one value for each combination of several contexts. One context may comprise a temporal context that is based on the time of day, day of the week, day of the month, season of the year, and/or other time or date measure (e.g., of the user viewing the web page at the client). Another context also may comprise a location context (of the user). Location may be defined with varying granularity, (e.g., continent; country, state/province, county, city, time zone, region). Context also may be determined based upon information about participating content being viewed by the user. For example, websites or web pages may be categorized with other websites or web pages having similar visitors and/or similar content to provide another context. In addition, the values accorded each word for each combination of contexts may be increased or decreased based on click-through rates, downstream activity (e.g., purchases, lead generation), advertising revenue (e.g., keyword bids), and/or customer surveys. Thus, words on a given web page may be assessed as to how well each word correlates to a given temporal context, location context, and content context.

FIG. 1 illustrates a method according to an example embodiment of the present invention. At step 112, word data is received at a server for processing. The received data includes words that form part of one or more web pages of each of a plurality of publisher web sites. Thus, the server may request the web pages and receive them for processing of the words. At step 114, each word (or in some instances phrases or word groups) is stored in memory of the server, such as in a database. At step 116, the server assesses the value (e.g., assigns a value) of each word or group of words. For ease of discussion, the remainder of the description will use the term "word" or "words", and either is also meant to include phrases (groups of words). The assessed value may be used to determine which words are selected as keywords on each webpage. For example, the value assessed to each word may be used to determine the relative value of each word (in comparison to other words) on each web page to thereby rate each word relative to the other words on the web page (or to sort the words on each page according to their value). The assessed value of each word also may be stored in memory of the server in association with the respective word. In some embodiments, each word is assessed and given a value (potentially, a different value) for each combination of multiple contexts, (e.g., a different value for each combination of different times of the day, different locations, and for different websites). For example, in an embodiment where the temporal context (time) is divided into twenty-four hours, and the location context is divided into six continents for a total of 144 contexts, there may be a corresponding 144 values assigned to each given word (for a given publisher's webpage) that are each associated with a different combination of time of day and continent. As will be discussed in more detail below, assessing the value may also include determining the video, video channel, advertiser, advertiser product category, and click through web page that provides the most value for each word for each given combination of contexts.

At step 118, the server may receive a request from a client (e.g., browser) for identification of the keywords for a webpage. The request may be transmitted, for example, when the web page of a publisher website is loaded into the client.

In one example, each web page (as stored on the publisher's web server) may include embedded program code that is executed upon the loading of such web page into the client. When an end user browses to a web page of a publisher web site, the embedded program code may be executed to gather, for example, a web page id (e.g., its URL or unique identifier), the current local time, and the IP address of the end user's computer, (which can be used to provide an indication of the physical location of the end user). The gathered information provides contextual information for the user's current viewing of that web page. The gathered information may be transmitted to, and received by, the server as part of the request at step 118.

At step 120, the processing server processes the gathered information to determine, based on the received contextual information (e.g., local time, webpage, and user's location (determined from the IP address)), which words on the web page (if any) should be highlighted as keywords. If any words are selected as keywords, at step 122 the server transmits to the client information identifying one or more words to be highlighted as keywords for this viewing of the web page (hereinafter "keyword identifying information"). The keyword identifying information is received by the embedded program code in the client, which responds by encoding the keywords to demarcate them and to hyperlink them as appropriate (e.g., to a content set).

In various embodiments, when the end user clicks on a demarcated (e.g., highlighted) keyword the syndicated media content may be requested by, and delivered to the client. For example, a new cascaded layer may be substantiated that presents (e.g., plays) the selected video in a video player, displays the selected channel of videos, and presents (e.g., displays or plays) one or more advertisements, which together provide (or correspond to) the value assessed to the actuated keyword in the given context (e.g., time, location, and web page). The advertisements may comprise video skin advertisements, interstitial advertisements, and/or other ad types.

At step 124, the server receives data for improving the assessment of the words (e.g., for performing step 116). For example, the data received may include the click-through rates of particular keywords, advertisements, contextual combinations (e.g., locations, times of the day, or combinations thereof), videos, video channels, advertiser brands, product categories, etc. This data may be used to improve a heuristic model (e.g., reduce the search space) for assigning values to words and for selecting content sets.

System Environment

Figure 2:
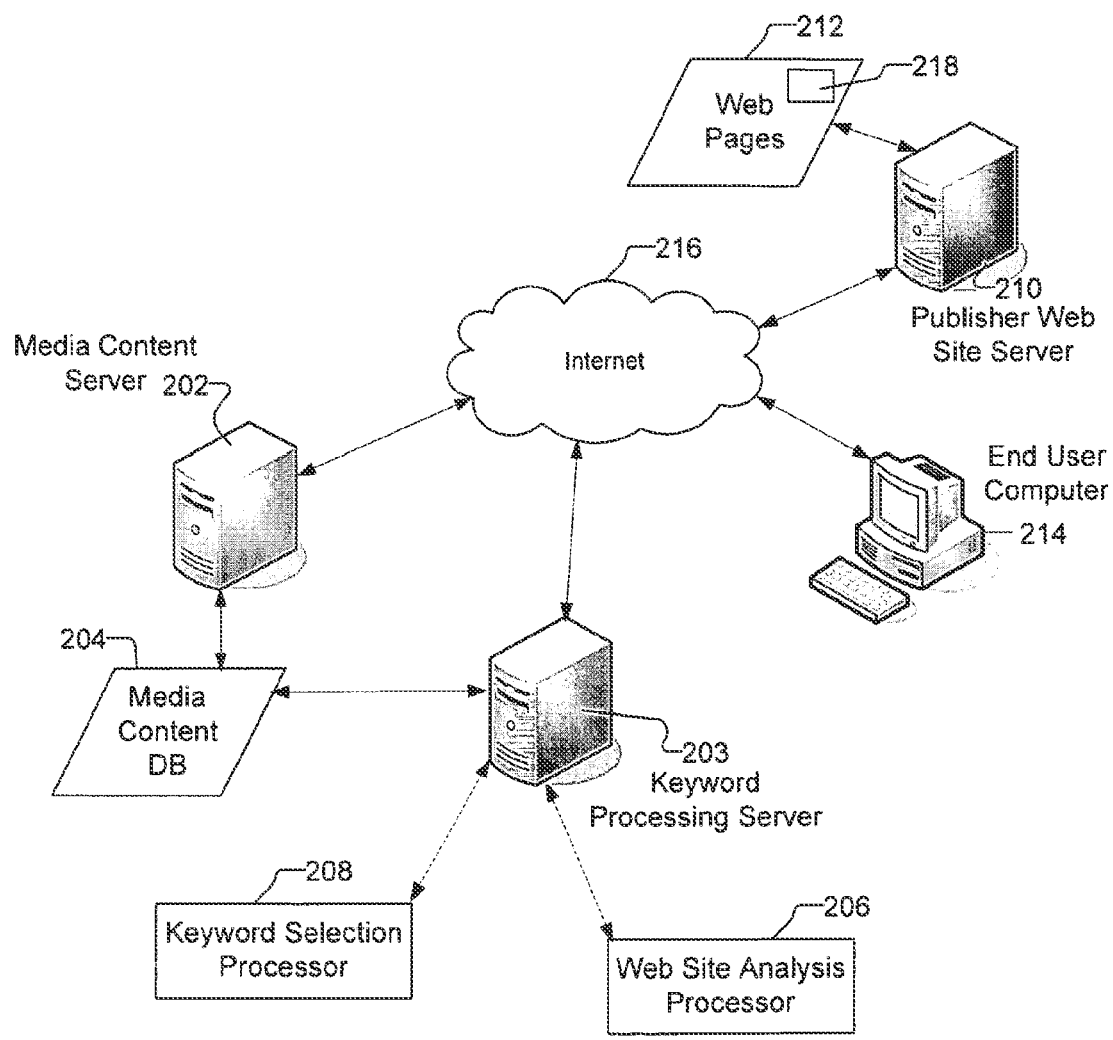
FIG. 2 is a functional block diagram of one example environment that may be used to implement some example embodiments of the present invention.

FIG. 2 illustrates the functional components of one example environment that may be used to select keywords and to select and deliver media content according to one example embodiment of the present invention. This example environment includes various computing devices, such as a media content server 202, a keyword processing server 203, a publisher web site server 210 (hosting the third party publisher's website), and an end user computer 214. The environment may also include data sources, such as web pages 212 and one or more media content data bases 204. In this example environment, the keyword processing server 203 may include application software such as a web site analysis processor 206 and a keyword selection processor 208.

As will be evident to those skilled in the art, in practice there would likely be a plurality of publisher web site servers 210, end user computers 214, media content servers 202, keyword processing server 203, along with other servers, processors and devices. However, for ease of explanation, only one device of each is illustrated for each function. Also, the illustrated architecture is one example of an architecture that may be used for implementing some embodiments of the present invention. Numerous other architectures may be used to implement these and other embodiments of the present invention.

The servers described herein may include one or more computer systems that each include a processor, memory, user input and user output mechanisms, a network interface, and executable program code (software) stored in memory that executes to control the operation of the server. Similarly, the processors 206, and 206 are functional components formed of one or more modules of program code executing on one or more computer systems. Various commercially available computer systems and operating system software may be used to implement the hardware and software. The components of each server (e.g., each computer system comprised of one or more computers) may be co-located or distributed. In addition, all or portions of the same software and/or hardware may be used to implement two or more of the functional servers (or processors) shown. Further, instead of the media content server 202 and keyword processing server 203 being separate, other embodiments may include a single server to perform the functionality of both of such servers. Thus, in some embodiments the components of FIG. 2 may be considered functional components that employ the same hardware and some of the same program code. Other embodiments may include different functional components. In addition, the present invention is not limited to a particular environment or server configuration.

The publisher server 210 may comprise any web server hosting a participating website having one or more web pages or other digital content. Each web page 212 may include embedded program code 218 that executes when the web page 212 is loaded into a client (e.g., browser).

When a web page 212 is loaded into the client, the embedded code 218 executes to request and receive the keyword identifying information and to highlight (and hyperlink) the identified keywords for presentation to the end user in the client at the end user computer 214. When the end user clicks on a keyword on the web page being viewed, a media request is sent and the selected media content may be received from the media content server 202 and presented on the end user computer 214.

The media content server 202 may comprise any server (hardware and software) capable of hosting media content, such as video content, advertisements, audio content and other content as previously described. The keyword processing server 203 may include any server (hardware and software) that is capable of executed the processing software. Media content may be stored in a media content database 204 and accessed by the processing server 203 and the media content server 202 to select keywords and deliver content to an end user computer 214 via the internet 216, another IP network, or an alternative network, (e.g., mobile telephone network).

The web site analysis processor 206 analyzes the web pages 212 of publisher web sites periodically or in response to some event, to assess the value of each word in the demarcated (e.g., HTML tagged) portions of the web pages of the web site. As discussed, a value may be stored for each assessed word for each of one or more combinations of contexts. Typically, this process may be performed offline (e.g., once per day, week or month), relative to the real time media content delivery processes triggered by the end user activity. In doing the assessment, this process may identify the combination of video, video channel, advertiser, advertiser product category, and click through web page (a media set) that provides the greatest value (in each of the combination of contexts). Information identifying the media set associated with each word that provides the greatest value for each context combination may also be stored in memory (e.g., a ranking).

The word selection processor 208 may perform a real time word selection process. More specifically, the word selection processor 208 receives the contextual information collected by the embedded software code 218 such as the web page URL, the end user computer's IP address, and the local current time. Using the URL, the processor 208 determines the words that are present on that web page from which one or more keywords may be selected. In addition, the processor 208 may determine the physical location of the user based on the received IP address. The word selection processor 208 then may determine words present on the web page that have highest value(s) for the given contextual information (e.g., for the given time, location of the user, and webpage). As discussed, the value of each word may have been previously determined for each set (combination) of contextual information by the web site analysis processor 206. Details of the word selection process are described below in a separate section. The keyword selection processor 208 transmits the keyword identifying information to the client for processing by the embedded code 218, which encodes the keywords to demarcate them and to insert a hyperlink for each of the keywords (e.g., by adding a hyperlink tag around each of the keywords). The keywords may be demarcated in any suitable manner such as by changing their color, underlining them, double-underlining them, changing the background color around the keyword, and/or another suitable manner of highlighting, emphasizing or distinguishing the selected words.

Methods of Selecting and Delivering Media Content

FIGS. 3-5 illustrate example processes for selecting keywords and for selecting and delivering media content according to an example embodiment of the present invention. FIG. 3 shows processes 220 performed at the end user computer 214. An end user operating their computer 214 may activate a browser program to view content accessible via an IP network, such as the internet 216. At step 222 the end user clicks on a link that is directed to a web page of a publisher's web site. In response, the publisher's web server 210 sends the requested web page 212 to the client (browser). When the end user computer 214 receives the web page, it is loaded into the user's client browser at step 224. In an alternate process, the web page of the publisher's web site may be loaded because the user has identified the web page as a start page (in which case the page is loaded at start-up of the browser), or as a favorite (which is actuated by the user), or through another suitable process. Among the content loaded as part of the web page is the embedded program code 218 that facilitates some aspects of the present invention.

At step 226 the end user computer 214 executes the embedded program code 218, which may perform various functions. One function performed includes gathering contextual data to be sent to the keyword processing server 203, where the data may be processed, such as by the keyword selection processor 208. In an example embodiment, the program code 218 gathers the URL of the web page being loaded; the current system local time as indicated by the end user computer, and the IP address of the end user computer 214 at step 228. As is well-known in the art, such data is readily available via the browser. In addition or alternately, information may be collected from a cookie stored on the user's computer 214. For example, the zip code of the user's home address may be collected (which may be different from the user's present address), the home address of the user, the area code of the user's home (or mobile) telephone may be collected. Any of such data may be used to determine the location of the user and/or the location of the user's home. In yet another embodiment, a unique user identification (ID) number may be collected from a cookie, which may be used by the server to retrieve user data (e.g., the user's home address) from a database, which data may have been previously provided by the user (or a third party). The collected data is transmitted to the keyword processing server 203, as indicated by arrow "A". The transmission may, therefore, provide a notification that the identified web page was loaded into the client and thereby act as a request for identification of keywords for that context (i.e., a request for keyword identifying information).

FIG. 4 shows a method that may be performed by the keyword selection processor 208 in response to receiving the collected contextual data—receipt of a request for keyword identifying information from a client (e.g., transmitted when the web page from the publisher web page is loaded into the user's browser). At step 252, the contextual data, (e.g., web page URL, local time, and the end user's computer's IP address) is received from the end user computer 214. Such data is used to determine which words are to be selected as keywords. In an example embodiment, the words on the web page that are eligible for being selected as keywords has been pre-established. These words are stored in memory of the server (or in the media content database 204) along with their associated value sets (and in some instances identification of a media set associated with each value set). In an example embodiment, a process for assessing the value and determining the ratings has been performed previously, such as when the web site analysis processor 206 analyzes the web page offline. The web page URL provides a means for the keyword selection processor 208 to identify the eligible words on the web page being viewed by the end user at step 254. At step 256, the words on the web page are processed to determine which words are to be selected as keywords for this viewing of the web page, given the current local time and location. As previously described, the location may be determined for example, based upon the IP address of the end user's computer 214.

As discussed, each word may have multiple values stored in memory, as determined by the web site analysis processor 206. The word selection processor 208 uses the value for the word that corresponds to the location and local time (and web page) received in the transmission to determine which words have the highest value for this viewing. In other words, the contextual data may be used as constraints in selecting the keywords. Thus, the value of each word on the web page may be compared (e.g., sorted) to determine the words having the highest value given the current local time, location, and URL (or in other embodiments some other set of constraints).

In this embodiment, the keyword selection processor 208 selects the words having the highest value given the contextual constraints and also that have a value greater than a minimum threshold value (which threshold may vary based on location, local time, URL, and/or other factors). Thus, the selected keywords may include all the words with a value higher than some prescribed, selected, and/or dynamic threshold. In another embodiment, the selected keywords may comprise the predetermined number of words that have the greatest value. In still another embodiment, the selected keywords comprise a predetermined number of words having a value greater than a threshold value. Alternately, or in addition thereto, the number of keywords selected for a given web page may be in proportion to the total number of words on the web page (or the number of words eligible for selection on the web page).

At step 258, the keyword identifying information is sent to the end user's computer 214. The indication may include the keywords themselves or an identifier corresponding to the word. For example, each word may have a corresponding number or other code which is known or computable by the keyword selection processor 208 and the embedded code 218 being executed at the end user computer 214.

In addition, the server 203 also may store a unique keyword identifier in the media content data base in association with each selected keyword as well as transmit the keyword identifier of each keyword to the embedded code. In addition, for each keyword identified, the keyword processing server 203 may store in memory information identifying the content set (media set) to be transmitted if a request (resulting from actuating of a keyword) is received.

Additional processing also may occur at the keyword selection processor 208 for each of the selected words. For example, at step 260 a content set such as a specific video content, a specific video channel, and/or specific advertisement(s) may be selected for (and correspond to) each selected keyword word. As discussed in more detail below, the content set may be selected by applying a heuristic model using the contextual data, (e.g., the time (Ti) and location (Li)), the selected word (Ki), and weights for the other variables (i.e., video URL (Vi); video channel (Ci); advertiser brand (Bi); product category (Pi); and media web address (Wi)).

As discussed, the keyword processing server 203 sends the keyword identifying information at step 258, which is received by the embedded program code 218 at step 230 as indicated by arrow "B". At step 232, the embedded program code 218, processes the received keyword identifying information and encodes the identified keywords. In an example embodiment, the keywords are encoded to highlight or otherwise demarcate the keyword's appearance as perceived by the end user. Encoding of the keywords also may include associating any desired action with the keyword. For example, each keyword may be encoded so that actuation (clicking) of the keyword results in a content set being presented to the user via the client. Such process typically will be accomplished by transmitting a request for a content set, receiving the content set, and presenting the content set to the user via the client. In an alternative embodiment, a hyperlink may be received for respective, selected words, such as at step 230.

The font color, style and/or weight may be altered to demarcate the keywords. In a specific example, the keywords are double-underlined and have a different font color. In addition, the encoding also may insert an anchor tag (e.g., <a href="http://www.Media_Content_Server_URL.com"> Keyword Here</a>) that causes the keywords to be hyperlinked to the media content server 202 (i.e., its link destination).

In this example, the keywords are encoded with an anchor tag that calls a javascript module (e.g., <a href="# JavascriptFunction(Keyword)">Keyword Here</a>) embedded in the web page (that forms part of embedded program code 218). Upon actuation of the hyperlinked keyword, the embedded code (e.g., the javascript function thereof) receives information identifying the keyword and responds accordingly. In one example, the embedded program code 218 initiates a video player in a new layer and transmits a request to the media content server 202 for a content set. The transmitted request may include additional information to allow the media content server 202 to determine which content set (media set) to be transmitted to the client such as the keyword identifier (or the keyword actuated).

At step 234, the demarcated (and hyperlinked) keywords are displayed by the client, along with the other content of the web page received from the publisher's web site server 210.

While viewing the web page, the end user may click on a highlighted keyword or otherwise activate the code associated with the highlighted word (e.g., such as via a mouse over function), as indicated by step 236. In an example embodiment of the present invention, at step 238 a video player 320 may be initiated in a new layer or tab of the existing browser or in a new browser window. In addition, at step 240, the javascript function forming part of the embedded program code 218 transmits a request for a content set to the media content server 202. Such request may include in varying embodiments, an indication of the keyword that was clicked such as a keyword identifier (or keyword ID) or the keyword itself (as well as other information to uniquely identify the client—which may be stored when the server transmits the keyword identifying information). The keyword ID may be assigned to the keyword by the keyword processing server 203 and stored along with the keyword and the value of the keyword in the media content database 204 or other database. In another embodiment, the request includes information indicating the content set (which may be transmitted along with the keyword identifying information for each selected keyword). Such request is received at the media content server 202 and processed at step 272 of FIG. 5. In response to receiving the keyword ID of the actuated keyword (or the keyword), the media content server 202 determines the content set to be transmitted to the end user computer 214 at step 274. Specifically, in one example, the media content server 202 accesses the media content database 204 to retrieve the information identifying the content set associated with the keyword ID received in the request, which information identifies (or is used to determine) the content set selected based on the user's location, local time, and web page. At step 276, the media content server 202 transmits the content set to the client from which the request originated.

At step 242 of FIG. 3, the content set is received at the client. At step 244, the content set is loaded into the client and specifically into the video player 320 and/or other application for presentation to the user. In one example, a selected video is loaded into, and presented by, a video player, a selected channel is loaded and displayed (e.g., a thumbnail of one or more videos that form part of the channel is visually displayed), and one or more selected advertisements such as video skin advertisements are displayed around the video player (e.g., sequentially).

Although the heuristic model is described as being performed by the keyword selection processor 208 during the process of selecting keywords, such analysis may be performed at another time or by another processor. For example, the heuristic model may be applied to the selected words by a different processor. In another example, the heuristic model may be performed at step 274, in response to a request for content, rather than being performed offline. In still another embodiment, the heuristic model may be re-applied for a given word after a predetermined number of selections of a word as a keyword (e.g., in a given context or irrespective of context) and/or after a predetermined number of user actuations (clicks) of a keyword (e.g., after steps 274, 276).

In some embodiments, when the user moves the cursor over the highlighted keyword, a description may appear giving information about the media set (the syndicated content) associated with that keyword, or a video player may pop up to present the video associated with that keyword (instead of requiring clicking on a the keyword).

Assessing a Value to Words

As discussed, presently there are billions of web pages, textual content, videos, and advertisements. Consequently, selecting keywords, advertisements, and click through web addresses from the vast number of available content in a manner to get the highest value is a difficult problem. The present invention reduces the generally intractable problem of selecting keywords and selecting content sets (e.g., what video, channel, and advertisements) and selecting web address (for click through) to a piece-wise linear optimization. In an example embodiment, algorithms are adapted, such as the Simplex method, Simulated Annealing, and Markov Simulations to correlate content sets with web page words. The general heuristic model is described below:

The value accorded each word on a web page (for those words that are assessed) may be represented by a value function, Value($V_i,C_i,B_i,P_i,W_i$), where:
  $V_i$, a video;
  $C_i$, a video channel
  $B_i$, an advertiser brand
  $P_i$, an advertiser product "category"
  $W_i$, a web address (e.g., web page) to be served to the user when the user clicks on the ad.

The invention need not be limited to these five variables, but typically these constraints/variables may be present.

As discussed above, the input to the value function also may include a set of constraints that include three other variables that model the content being presented to the user; the geographic location where the content is presented; the word, and the time at which the content is presented:
  $L_i$, the current geographical location of the user
  $K_i$, a keyword, a word that is visible to the user at location $L_i$
  $T_i$, the current local time (e.g., in a 24-hour period such as 0-24)

In addition, the web page address (e.g., the website or domain) of the web page viewed by the user also may be considered. Constraints may be represented as linear inequalities that draw from the 8-dimensional (or 9-dimensional) space above. The solution translates these linear equalities into a multi-dimensional polytope representing the space of all possible content sets (e.g., video experiences) to present to the user.

A heuristic model may be applied to this polytope, choosing a set of points contained within the polytope. As a simple example, we can use the Identity function for all ads, where every point in space is initially given an equal value of one:
  Value($V_i,C_i,B_i,P_i,W_i$)=1

The resulting polytope represents the entire space of all the combinations of web addresses ($W_i$), videos ($V_i$), channels ($C_i$), brands ($B_i$), and products ($P_i$). We can then apply a simple heuristic, such as a "Randomo" heuristic function, that chooses a random point within this space. For example, the function may choose a random:
  video ($V_i$) within the set of all videos;
  channel $C_i$ within all channels, such that $C_i$ contains $V_i$;
  advertiser brand $B_i$;
  category $P_i$ such that $P_i$ is a category of brand $B_i$;
  web address $W_i$ representing (e.g., advertising, offer to purchase, etc.) a particular product $P_0$ such that $P_0$ is within $P_i$.

This simple model produces a random sampling of ads to the user. The heuristic mode uses data of past user activity (e.g., click through rates of keywords, advertisements (e.g., video skin ads), etc.) and other activity (e.g., revenue paid by advertisers (e.g., bids)) to reduce the search space within the polytope for particular combinations of constraints to thereby improve the Value function and value of the selected content set and keyword. More sophisticated models may be implemented.

As another example, the algorithm can return the same video experience to everyone by using an identity function with constraints. We represent constraints as:
  Value ($K_i, T_i, B_i, P_i, W_i$)>=Vmin, the minimum value achieved when showing an advertiser $B_i$ with product $P_i$ directing to web address $W_i$ to a user viewing a keyword $K_i$ at time $T_i$; and
  Value($K_i, T_i, B_i, P_i, W_i$)<=Vmax, the maximum value achieved when showing an advertiser $B_i$ with product $P_i$ directing to web address $W_i$ to a user viewing a keyword $K_i$ at time $T_i$.

Various embodiments of the value function and heuristic model may be implemented. One skilled in the art will recognize that a value "computed" via the value function will be the result of the combination values for each of the variables given the constraints. Consequently, while providing potential examples of the influence of such variables, the following examples of such influences may be dependent on the values of the other variables of the function and the discrete examples below should not be extrapolated to infer that such examples will be applicable in all instances or that such influences are independent of the other variables.

In one example embodiment the video (when incorporated into the value function as the video variable ($V_i$)) may increase the value of the value function (e.g., result in a higher value function and/or itself be accorded a higher value) based on user ratings of the video, the percentage of users who view the video to completion, the percentage of users who click on an advertisement when the video is presented, and/or other factors. Additionally (for example purposes only), in one example embodiment, a channel (when incorporated into the value function as the channel variable ($C_i$)) may increase the value of the value function (e.g., result in a higher value function and/or itself be accorded a higher value) based on user ratings of the channel, the percentage of users who view one or more videos of the channel, the percentage of users who click on an advertisement when the channel is viewed or presented, and/or other factors. In addition (for example purposes only), in one example embodiment, an advertiser's brand (when incorporated into the value function as the channel variable (Bi)) may increase the value of the value function (e.g., result in a higher value function and/or itself be accorded a higher value) based on user ratings of the brand (e.g., popularity), the percentage of users who click on an advertisements of the advertiser's brand, and/or other factors. Further (for example purposes only), in one example embodiment, an product category (when incorporated into the value function as the channel variable (Pi)) may increase the value of the value function (e.g., result in a higher value function and/or itself be accorded a higher value) based on user ratings of the product (e.g., popularity), the percentage of users who click on an advertisements for the product (or similar products), and/or other factors. Finally (for example purposes only), in one example embodiment, the web address (e.g., the web page) to be served to the user when the user clicks on the ad (when incorporated into the value function as the channel variable (Wi)) may increase the value of the value function (e.g., result in a higher value function and/or itself be accorded a higher value) based on the percentage of users who click on the link (e.g., an advertisement) to that web address, the amount paid by the advertiser for each click-through (e.g., advertiser's bid), lead generation (e.g., user completes an HTML form), page views, and/or product purchased, and/or other factors.

As discussed and as will be dependent to one skilled in the art, the influence of each variable (i.e., the impact of each variable on the value function) will be dependent on the other variables. For example, an advertisement may have different click through rates depending on the video and/or the video channel presented to the user. Similarly, a given web address may be assessed a greater value (e.g., because the advertiser may pay (bid) more)), for click-throughs from users who are watching a particular video or type of video (e.g., because such users are more likely to buy the advertised product).

In one example embodiment, videos and video channels may be categorized and the categorization of each video and channel is used in the value function. Similarly, advertiser brands, products, and/or web addresses may similarly be categorized for use in the value function.

Video Player Example Embodiments

Figure 6:
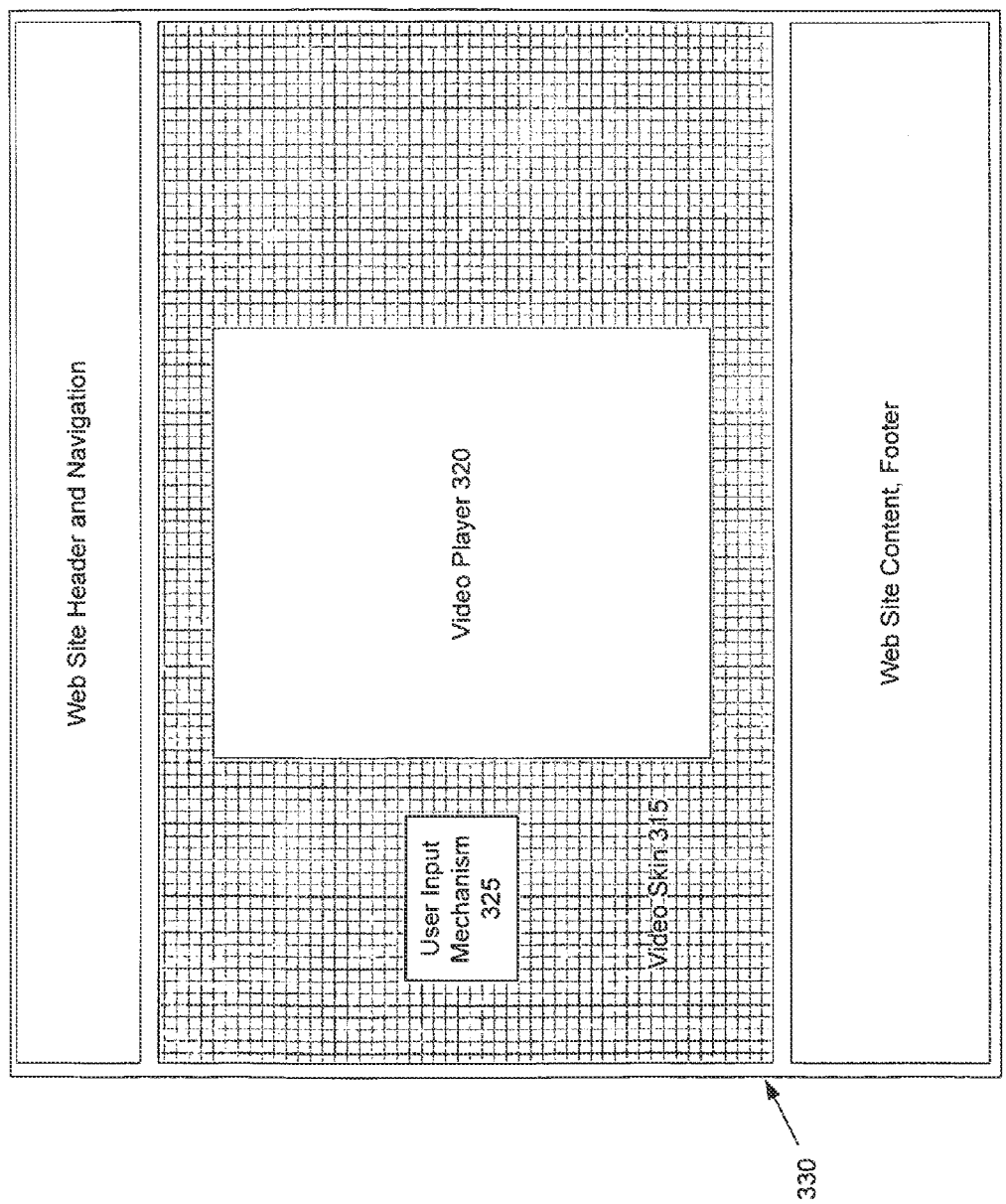
FIG. 6 is a schematic representation of an example video skin and video player in accordance with some example embodiments of the present invention.
Figure 7:
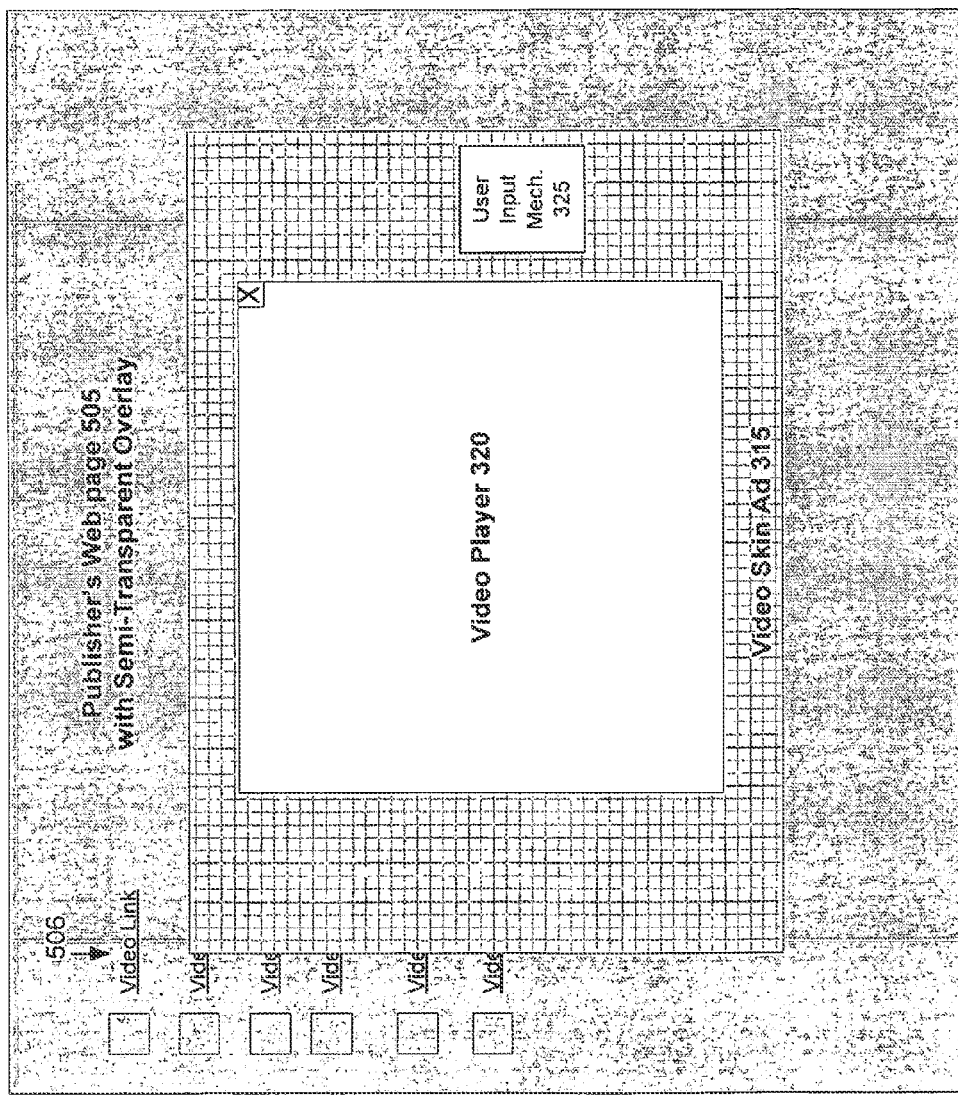
FIG. 7 is a schematic representation of another example video skin and video player in accordance with some example embodiments of the present invention.

In an example embodiment the syndicated media content may be presented for viewing in a video player, as shown in FIGS. 6 and 7. In an example embodiment, the video player may include an interactive video "skin" and comprise works and/or advertisements that are selected and/or customized based on contextual information such as geographical location, current time, and web page content. As will be discussed in more detail, the media works and advertisements may be selected or customized in any suitable manner such as by, for example purposes only, (1) providing information of venders local to the end user, (2) selecting advertisements that correlate to the time of day, day of week, season of the year or other time/date indication, (3) selecting scenery based on the end user's location or time, (4) sizing and formatting the advertisement according to the user's computing device, and (5) various other customizations. Such selection criteria may be implemented as various weights for variables of the heuristic model, (e.g., variables Vi, a video URL; Ci, a video channel; Bi, an advertiser brand; Pi, an advertiser product "category"; Wi, a web address to send the user whenever they click on the ad). For example, a media work presented may be customized by inserting a product (i.e., product placement) targeted to the time or location. These selections and customizations are for example purposes only and the present invention is not limited to these examples.

The syndicated media content may be presented to the user by the video player 320, which may comprise a software program that executes on the user's computing device 214. The video player 320 of this example embodiment may allow the end user to hear audio content, hear and see video content, select and create channels, search for videos and/or channels, subscribe to a channel, and take other actions. In this example embodiment, the video player 320 (see FIG. 6) comprises a Flash application that executes within the existing browser window. In another example embodiment, a new browser (a pop-up) window may be initiated and the video player 320 (see FIG. 7) may be actuated and disposed in the new browser with the advertisement or other media content, such as in the video skin 315. The present invention, however, is not limited to a particular type of advertisement, media content, or video player.

With regard to advertisements, each type of advertisement may be configured to display at a different time or location (relative to the video content) from other advertising types. The various advertising types may be of the same or different file type (e.g., jpeg, swf, flv, mpg, etc.). FIGS. 6-9 illustrate a first type of advertisement referred to herein as a video skin ad 315 that is configured to be displayed along a periphery of the video player 320 and, in some instances, concurrently with video content (the video content that is presented by the video player 320). The video skin advertisement 315 may comprise a gif, jpeg or other still image type or a flash or other rich media type, and may include an associated hyperlink (i.e., a click-through URL) and/or form for receiving information from the user and is discussed in more detail below. In this example, the video skin ad 315 extends around the entire perimeter of the video player 320. In other embodiments, the video skin 315 does not extend around the entire perimeter of the video player 320, but instead is adjacent each vertical side of the video player, 320, each horizontal side of the video player, or only one side of the video player 320.

FIGS. 6 and 7 illustrate example embodiments of a video skin 315 that is presented with a video player 320. In one embodiment illustrated in FIG. 6, the video player 320 and video skin ad 315 may be presented in a new browser window 330 or new tab within the browser. Depending on the embodiment, the web page 505 that contains the hyperlink to the video, the video player 320, or an application in the browser window 330 presenting the advertisement (e.g., the control logic of the interactive content) may transmit a request for the video skin ad 315, transmit notification of the impression, and/or transmit notification of a click-through of the ad unit.

In another embodiment (and as illustrated in FIG. 7) the video skin ad 315 and video player 320 may be displayed over (in front of and partially obscuring) the web page 505. In other words, the video skin 315 and player 320 need not be presented in a separate browser window, but may displayed over the existing web page 505 (i.e., the web page 505 that includes the hyperlink 506 to the video content). In one example embodiment, the video player 320 and the video skin ad 315 may be presented as part of a flash application that initiates when the user clicks on the hyperlink 506 associated with the video. The flash application controls the display of the video player 320 over the video skin ad 315.

In yet another embodiment, the video skin ad 315 may comprise a piece of embedded "content" that is entirely independent of the video player and displayed above the player, in a separate layer. More specifically, the video player 320 and the video skin ad 315 may be displayed the topmost Cascading Style Sheet (CSS) layer of the publisher's web page 505. Depending on the embodiment, the video player 320 may be the publisher's proprietary player, a player service such as Brightcove®, or a third party embedded player 320, such as from YouTube®. In other embodiments, the displayed elements could also include a combination of "content" served from the publisher's web server and any of the above types of player. For example, the video skin ad 315 may appear in a CSS layer below a video player 320 in a window-like border (with a close box in the upper right hand corner) as illustrated in FIG. 7. In this example, the video player 320 could be received from any server, the border may be served by the publisher's web server, the video skin ad 315 may be embedded content from the ad server 100, and the web page 505 below the other elements may be served by the publisher's web server. The CSS layering of those elements is controlled by the logic (i.e., JavaScript code within the web page) served by the publisher's web server 160. Various other means of presenting the video skin ad 315 to the end user may also be used.

Referring to FIGS. 6 and 7, the video skin 315 may include a user input mechanism 325 that allows the user to input information or otherwise interact with the advertisement (and its associated control logic). The user input mechanism is shown schematically in FIGS. 6 and 7 and may comprise any suitable mechanism for obtaining the desired information including, but not limited to, one or more of text fields, text areas, check boxes, radio buttons, and/or drop down lists.

The video skin ad 315 may include an associated hyperlink that provides a click through to an advertiser URL so that if the user clicks a portion of the video skin ad 315, additional content (e.g., a form, a more detailed advertisement or other content) is presented. Specifically, in one example embodiment if the user clicks on the video skin ad 315, the client browser transmits a request to the media content server 202 (or, alternatively, a third party server) for a data file, which (depending the advertiser, the link, and other factors) may be an HTML page (i.e., a web page), a video, a flash animation, an audio file, and/or other content. The content of the data file may include (1) an offer to provide more information, for example, including a form to allow the user to provide his or her personal information such as name, address, email address, phone number, etc.; (2) additional information about the advertiser's product or service; (3) a request that the user purchase of a product or service (e.g., additional information with a "buy now" link); (4) a request for payment (e.g., a form to allow the user to provide credit card information); (5) an offer to download content; or (6) some combination of these. The data file may be presented in the video skin or in a new browser window. In addition thereto or alternately, the video skin ad 315 may display a user input mechanism for supplying additional information to, for example, purchase a product or service, request additional information (e.g., related to the video), or otherwise interact with the video skin (and/or advertiser).

Figure 8:
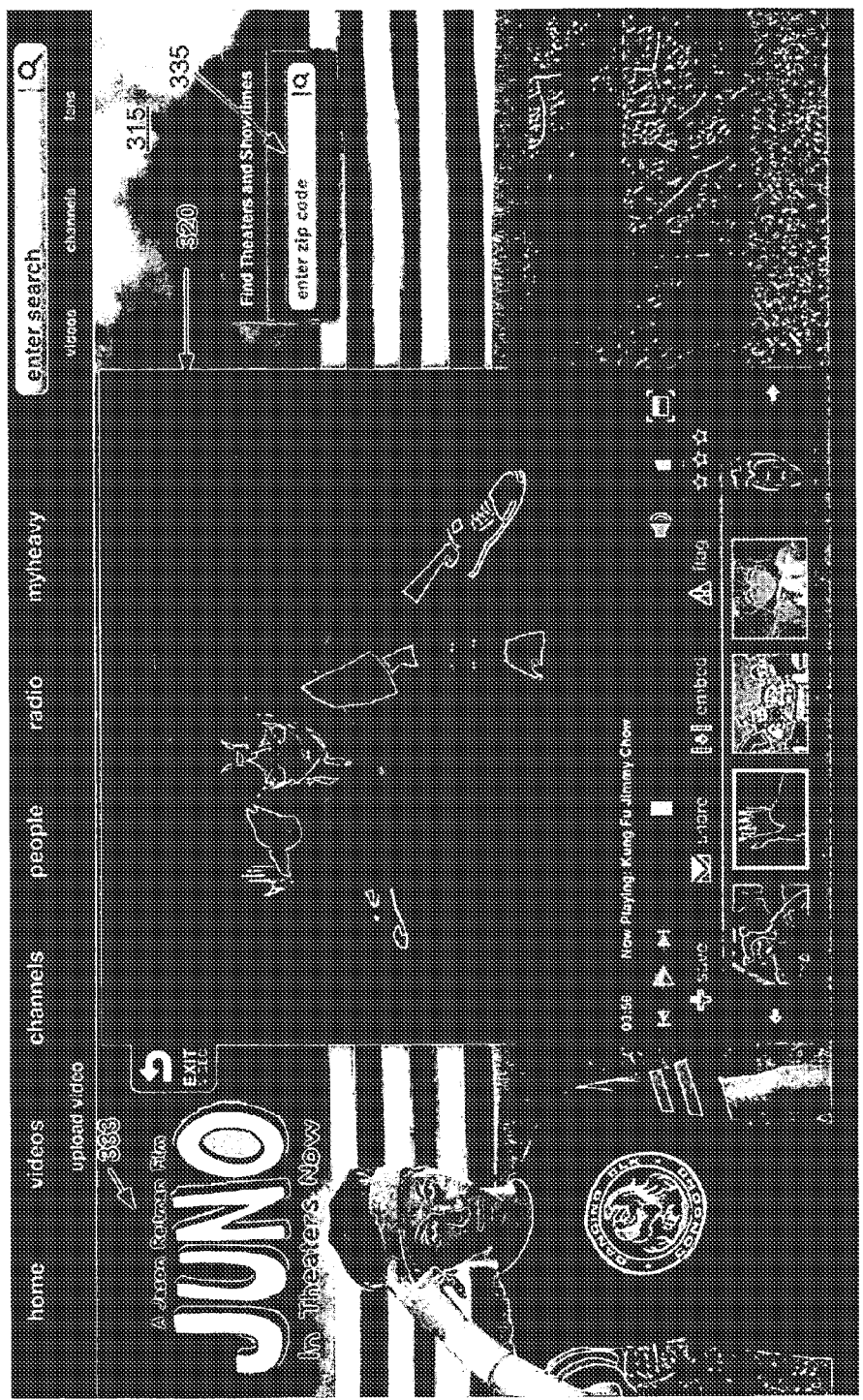
FIG. 8 illustrates an example video skin ad and video player in accordance with an example embodiment of the present invention.
Figure 9:
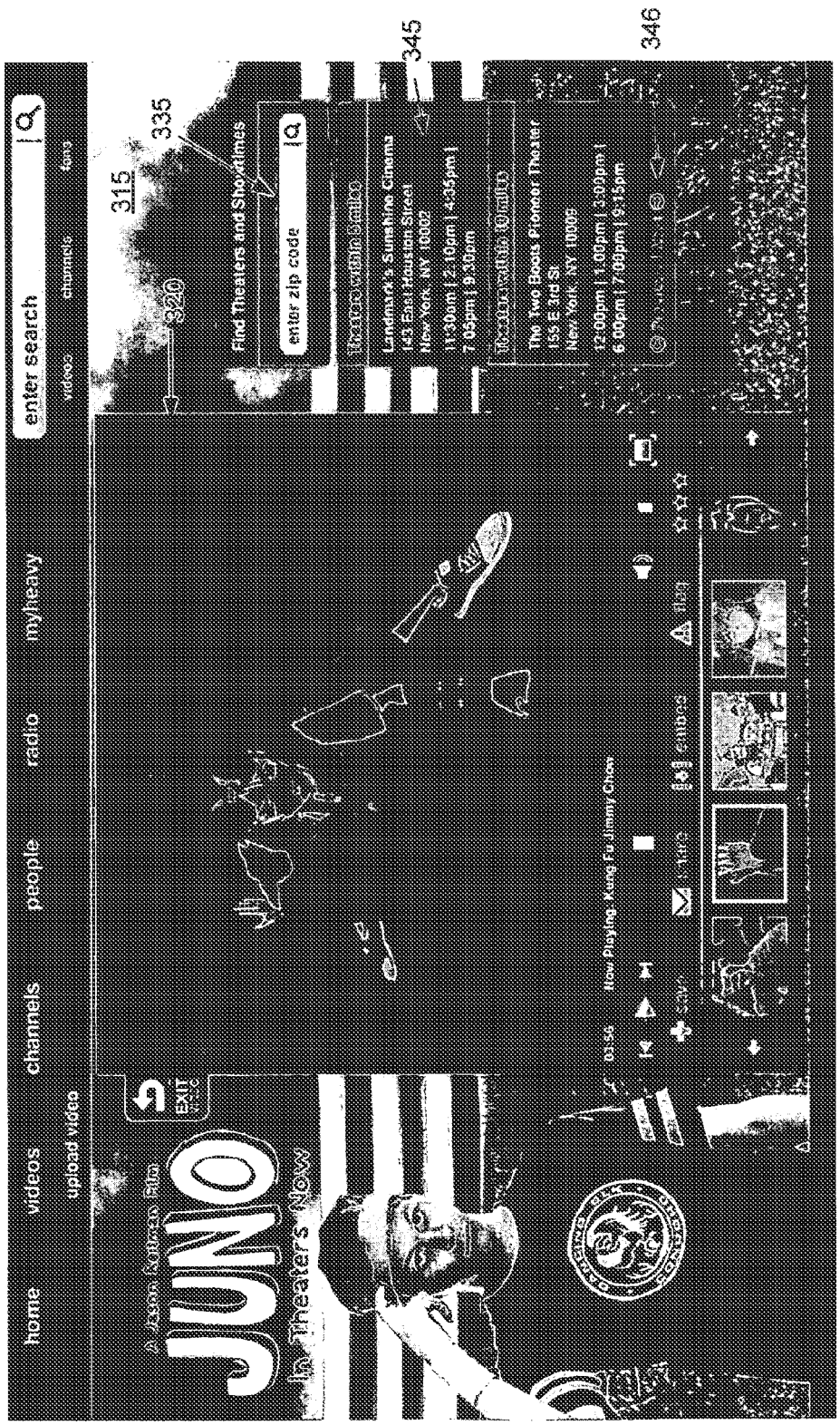
FIG. 9 illustrates an example of another video skin ad and video player in accordance with an example embodiment of the present invention.

FIGS. 8 and 9 illustrate an example implementation of the present invention for providing contextual advertising in a video skin. Referring to FIG. 8, an end user has clicked on a link to view a video (an animation) that is depicted in the video player 320. The video skin ad 315 is shown presenting a contextual advertisement that comprises an advertisement for a movie, Juno®. In this example embodiment, the advertisement 315 has been selected based on the content of the video (an animation) because it is likely that an end user who is interested in the animated video may be a target market for the movie Juno. The video skin ad 315 also includes a form 335 that allows the end user to supply a zip code in order to find nearby theaters that are showing the movie Juno. When the user enters a zip code and submits the form 335, the information of the theaters near the zip code are determined and sent back. Upon receipt of the theater information, the theaters 345 are displayed on the form 335, as is illustrated in FIG. 9. As is evident from the bottom of the theater information, the video skin ad 315 also displays navigation buttons 346 to allow the user to page through additional lists of nearby theaters showing the movie. Thus, the video skin ad 315 interacts with the end user. In other implementations, an advertisement for a particular type of automobile (e.g., Nissan®) may be presented as the video skin ad 315 (e.g., because the video relates to automobiles) with a form 335 used to supply a zip code that is subsequently used to determine and provide the nearby dealerships offering the particular type of automobile. In other embodiments, the form 335 may be used to collect information from the user such as the user's email address, phone number, name, home address, profession, and other personal or demographic information.

Figure 10:
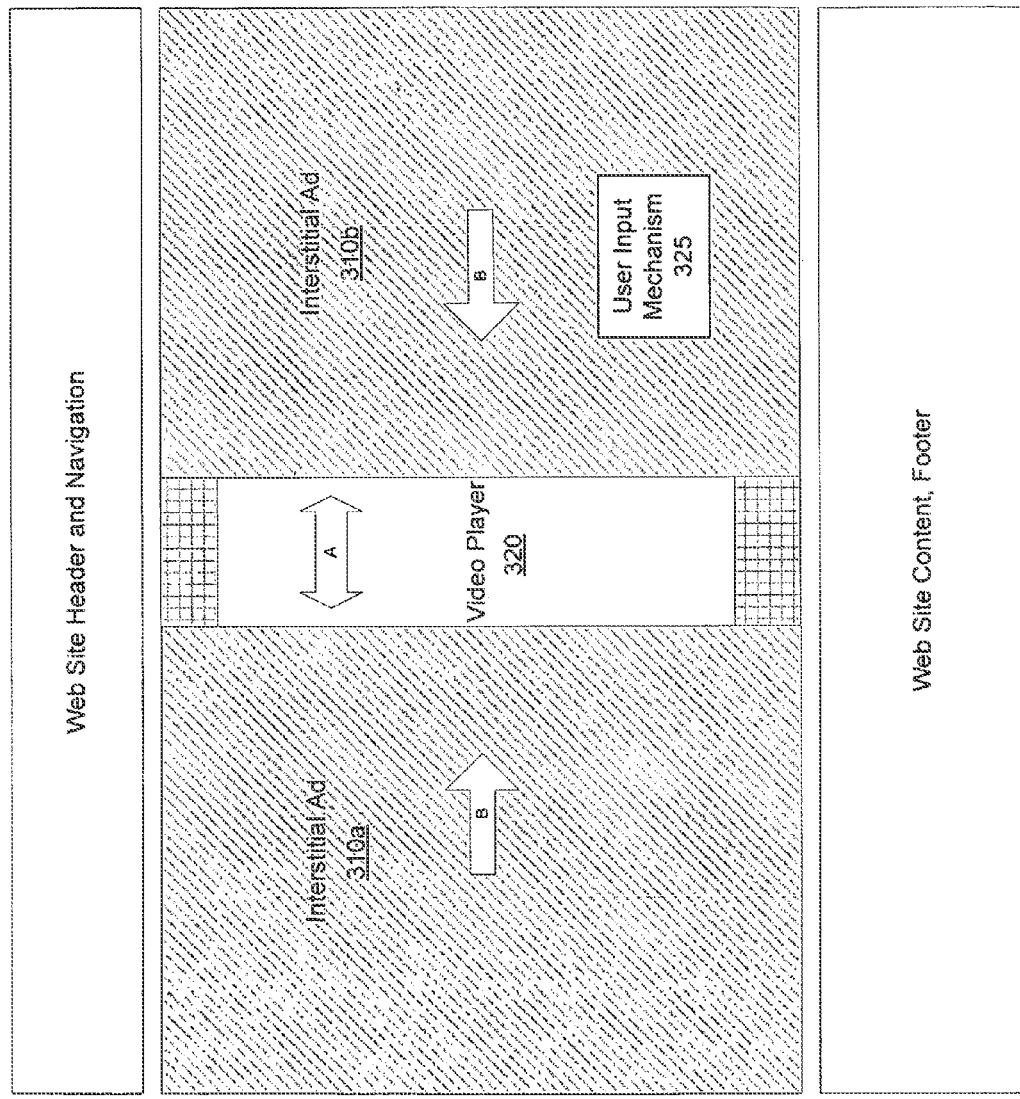
FIG. 10 is a schematic representation of an example interstitial advertisement and video player in accordance with some example embodiments of the present invention.
Figure 11:
FIG. 11 illustrates an example interstitial advertisement and video player in accordance with an example embodiment of the present invention.

A second type of advertisement is an interstitial advertisement that may comprise one or more images (static or video) that are displayed prior to (or after) the video content and that split apart into multiple portions just prior to the beginning of the video content (or come together just after the end of the video content), and may act as a pre-loader while the upcoming video is buffered or transmitted. Referring to FIGS. 10 and 11, one example interstitial advertisement, a jpeg image (although other embodiments may include one or more jpeg, gif, mpg or other files) separates along a vertical line in a manner that is similar to two doors sliding apart to reveal the beginning of the video content. The interstitial advertisement also may include audio content. The arrows in FIG. 10 illustrate the movement of the interstitial ad of one example embodiment. Specifically, the Interstitial ad may comprise a sliding-door style ad that opens (as indicated by arrow A) such as, for example, at the beginning of the video (or prior to presentation) and to reveal the video player and video. When the interstitial ad finishes opening, it may no longer visible in some embodiments (e.g., and, in some embodiments, may open to reveal a video skin ad 315). In addition, when presentation of the video is complete, the doors 310*a,b* of the interstitial ad 310 may come together to close completely (as indicated by arrows B). The Interstitial ad 310, while wholly visible or partially visible, (either at the beginning or after the video presentation) may provide a click through to an advertiser URL so that if the user clicks on any portion of the interstitial ad the advertiser's content is presented and/or a user input mechanism 325 (e.g., form inputs) to allow the user to supply information. FIG. 11 provides an example of such an interstitial ad 310 that has begun to separate into two portions 310*a* and 310*b*. When the user clicks on the interstitial ad or submits a form in the interstitial ad, the client browser transmits a request to the ad server 100 (or, alternately, the advertiser's server or a third party server) for a data file, which (depending the advertiser, the link, and other factors) may be an HTML page (i.e., a web page), a video, a flash animation, or other content.

A Pre-roll advertising type comprises an advertisement (e.g., video or still image) that is presented to the viewer just prior to the beginning of the video content and may include an associated hyperlink to the advertiser and/or a form. The interstitial ad 310 may form one type of pre-roll advertisement. While not included in this example embodiment, other implementations may further include a post-roll advertising type, which may comprise a video (or still image) that is presented to the viewer at the end of the video content (which an interstitial ad that closes may comprise one example). In addition, other implementations may further include one or more mid-roll advertisements that comprise a video (or image) that is presented to the viewer at one or more cue points (location and/or time) in the middle of the video content (between segments of the video). The various ads types may be controlled by the same or different control logic.

The present invention has been described in the context of syndicating the delivery of contextual advertisements and customized video content to a plurality of end user computing devices 214 via an IP network 216, such as the internet. However, it is equally well suited for syndicating interactive content for providing contextual advertisements and/or customized video content via an alternative network, such as one or a plurality of mobile telephone networks (or via a combination of the internet and mobile telephone networks), wherein the content is presented on wireless mobile telephones or other portable communication devices.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method comprising:
    determining, by a first computing device, a plurality of values for a plurality of keywords of a web page, wherein each of the plurality of values is based on a combination of variables including location, local time, and content being viewed;
    receiving, by the first computing device from a second computing device, a request for identification of the plurality of keywords of the web page;
    receiving, by the first computing device from the second computing device, data associated with the second computing device;
    determining, by the first computing device, a location of the second computing device, a local time at the second computing device, and content being viewed at the second computing device based on the data associated with the second computing device;
    selecting, by the first computing device, a value from among the plurality of values for the plurality of keywords that corresponds to the location of the second computing device, the local time at the second computing device, and the content being viewed at the second computing device;
    determining, by the first computing device, that the value meets a criterion;
    responsive to determining that the selected value meets the criterion, selecting, by the first computing device, a keyword associated with the selected value;
    determining, by the first computing device, keyword identifying information based on the value and the keyword, wherein the keyword identifying information comprises a link that, when activated, causes a request for selected video content to be generated;
    transmitting, by the first computing device to the second computing device, the keyword identifying information;
    receiving the request for the selected video content to be generated; and
    presenting the selected video content to the second computing device for display in a video player having an interactive video skin displayed along at least a portion of a periphery of the video player, the interactive video skin comprising a hyperlink configured to be actuated by a user and one or more form elements configured to receive input from the user.

2. The method of claim 1, wherein the second computing device comprises a mobile telephone.

3. The method of claim 2, wherein the data associated with the second computing device is transmitted to the first computing device at least partially over a mobile telephone network.

4. The method of claim 2, wherein at least some of the data associated with the second computing device is included in a cookie stored on the mobile telephone.

5. The method of claim 1, wherein the selected video content comprises an advertisement.

6. The method of claim 1, wherein the selected video content is sized and/or formatted at least in part based on capabilities of a mobile telephone.

7. The method of claim 1, wherein the second computing device comprises a plurality of mobile telephones.

8. The method of claim 7, wherein the data associated with the second computing device is transmitted over one or more mobile telephone networks.

9. The method of claim 1, wherein the location of the second computing device is determined based on an IP address of the second computing device.

10. A server computer comprising at least one processor and non-transitory computer-readable media having instructions stored thereon that are configured to, in response to execution by the server computer, cause the server computer to:
    determine a plurality of values for a plurality of keywords of a web page, wherein each of the plurality of values is based on a combination of variables including location, local time, and content being viewed;
    receive, from a second computing device a request for identification of the plurality of keywords of the web page;
    receive, from the second computing device, data associated with the second computing device;
    determine a location of the second computing device, a local time at the second computing device, and content being viewed at the second computing device based on the data associated with the second computing device;

select a value from among the plurality of values for the plurality of keywords that corresponds to the location of the second computing device, the local time at the second computing device, and the content being viewed at the second computing device;

determine that the value meets a criterion;

responsive to determining that the value meets the criterion, select a keyword associated with the selected value;

determine keyword identifying information based on the value and the keyword, wherein the keyword identifying information comprises a link that, when activated, causes a request for selected video content to be generated;

transmit, to the second computing device, the keyword identifying information;

receive the request for the selected video content to be generated; and present the selected video content to the second computing device for display in a video player having an interactive video skin displayed along at least a portion of a periphery of the video player, the interactive video skin comprising a hyperlink configured to be actuated by a user and one or more form elements configured to receive input from the user.

11. The server computer of claim 10, wherein the second computing device comprises a mobile telephone.

12. The server computer of claim 11, wherein the data associated with the second computing device is transmitted to the first computing device at least partially over a mobile telephone network.

13. The server computer of claim 11, wherein at least some of the data associated with the second computing device is included in a cookie stored on the mobile telephone.

14. The server computer of claim 10, wherein the selected video content comprises an advertisement.

15. The server computer of claim 10, wherein the selected video content is sized and/or formatted at least in part based on capabilities of a mobile telephone.

16. The server computer of claim 10, wherein the second computing device comprises a plurality of mobile telephones.

17. The server computer of claim 16, wherein the data associated with the second computing device is transmitted over one or more mobile telephone networks.

18. The server computer of claim 10, wherein the location of the second computing device is determined based on an IP address of the second computing device.

19. A non-transitory computer-readable medium having instructions stored thereon that are configured to, in response to execution by one or more first computing devices, cause the one or more first computing devices to:

determine a plurality of values for a plurality of keywords of a web page, wherein each of the plurality of values is based on a combination of variables including location, local time, and content being viewed;

receive, from a second computing device, a request for identification of the plurality of keywords of the web page;

receive, from the second computing device, data associated with the second computing device;

determine a location of the second computing device, a local time at the second computing device, and content being viewed at the second computing device based on the data associated with the second computing device;

select a value from among the plurality of values for the plurality of keywords that corresponds to the location of the second computing device, the local time at the second computing device, and the content being viewed at the second computing device;

determine that the value meets a criterion;

responsive to determining that the selected value meets the criterion, select a keyword associated with the selected value;

determine keyword identifying information based on the value and the keyword, wherein the keyword identifying information comprises a link that, when activated, causes a request for selected video content to be generated;

transmit, to the second computing device, the keyword identifying information;

receive the request for the selected video content to be generated; and present the selected video content to the second computing device for display in a video player having an interactive video skin displayed along at least a portion of a periphery of the video player, the interactive video skin comprising a hyperlink configured to be actuated by a user and one or more form elements configured to receive input from the user.

20. The non-transitory computer-readable medium of claim 19, wherein the second computing device comprises a mobile telephone.

21. The non-transitory computer-readable medium of claim 20, wherein the data associated with the second computing device is transmitted to the one or more first computing devices at least partially over a mobile telephone network.

22. The non-transitory computer-readable medium of claim 20, wherein at least some of the data associated with the second computing device is included in a cookie stored on the mobile telephone.

23. The non-transitory computer-readable medium of claim 19, wherein the selected video content comprises an advertisement.

24. The non-transitory computer-readable medium of claim 19, wherein the selected video content is sized and/or formatted at least in part based on capabilities of a mobile telephone.

25. The non-transitory computer-readable medium of claim 19, wherein the second computing device comprises a plurality of mobile telephones.

26. The non-transitory computer-readable medium of claim 25, wherein the data associated with the second computing device is transmitted over one or more mobile telephone networks.

27. The non-transitory computer-readable medium of claim 19, wherein the location of the second computing device is determined based on an IP address of the second computing device.

* * * * *